US008384317B2

(12) United States Patent
Shikayama et al.

(10) Patent No.: US 8,384,317 B2
(45) Date of Patent: Feb. 26, 2013

(54) LINEAR MOTOR DEVICE (75) Inventors: Toru Shikayama, Kitakyushu (JP);
Katsutoshi Yamanaka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 258 days.

(21) Appl. No.: 12/987,958

(22) Filed: Jan. 10, 2011

(65) Prior Publication Data
US 2011/0101896 A1 May 5, 2011

Related U.S. Application Data (63) Continuation of application No. PCT/JP2009/054770, filed on Mar. 12, 2009.

(30) Foreign Application Priority Data

Aug. 19, 2008 (JP) ................................ 2008-210284

(51) Int. Cl.
*H02K 41/02* (2006.01)
(52) U.S. Cl. ...................................... 318/135; 310/12.01
(58) Field of Classification Search .................. 318/135; 310/12.01, 12.11
See application file for complete search history.

(56) References Cited

U.S. PATENT DOCUMENTS

| 5,920,164 | A | * | 7/1999 | Moritz et al. ................. 318/687 |
| 5,990,583 | A | * | 11/1999 | Nanba et al. ............... 310/12.14 |
| 6,590,355 | B1 | | 7/2003 | Kikuchi et al. |
| 2002/0021050 | A1 | * | 2/2002 | Fujisawa et al. ............... 310/12 |
| 2002/0089237 | A1 | * | 7/2002 | Hazelton ......................... 310/12 |
| 2008/0106155 | A1 | | 5/2008 | Yamada et al. |

FOREIGN PATENT DOCUMENTS

| JP | 62-290347 | 12/1987 |
| JP | 04-229092 | 8/1992 |
| JP | 3329873 | 9/1994 |
| JP | 2001-085503 | 3/2001 |
| JP | 2001-119916 | 4/2001 |
| JP | 2002-199782 | 7/2002 |
| JP | 2006-087178 | 3/2006 |
| JP | 2006-087230 | 3/2006 |
| WO | WO 2006/038510 | 5/2008 |

OTHER PUBLICATIONS

Japanese Office Action for corresponding JP Application No. 2010-525619, Feb. 28, 2011.
Japanese Office Action for corresponding JP Application No. 2010-525619, May 19, 2011.
International Search Report for International Application No. PCT/JP2009/054770, May 26, 2009.
Written Opinion of the International Searching Authority for International Application No. PCT/JP2009/054770, May 26, 2009.

* cited by examiner

*Primary Examiner* — Walter Benson
*Assistant Examiner* — Iftekhar Mustafa
(74) *Attorney, Agent, or Firm* — Ditthavong Mori & Steiner, P.C.

(57) ABSTRACT

Provided is a linear motor device which is compact even when a stroke is increased, which can reduce heat generation, and which can eliminate damping force caused by circulating current. The linear motor device includes a linear motor that includes a movable member having a plurality of fields and a stator in which a plurality of armatures including polyphase coils are arranged in line in the moving direction of the movable member, and a controller that sequentially outputs control commands to current amplifiers respectively connected to the armatures in accordance with the relative position of the movable member. The controller selectively outputs the control commands to only the current amplifiers corresponding to the armatures which are opposite the movable member such that the armatures are positioned within a range corresponding to the length in the moving direction of the movable member.

9 Claims, 7 Drawing Sheets

LINEAR MOTOR DEVICE

CROSS-REFERENCE TO RELATED APPLICATIONS

The present application claims priority to Japanese Patent Application No. PCT/JP2009/054770, filed Mar. 12, 2009, which claims priority to Japanese Patent Application No. 2008-210284, filed Aug. 19, 2008. The contents of these applications are incorporated herein by reference in their entirety.

BACKGROUND OF THE INVENTION

1. Field of the Invention

The present invention relates to a linear motor device.

2. Discussion of the Background

For example, Japanese Unexamined Patent Application Publication No. Hei 04-229092 discloses a linear synchronous motor including a movable member that produces a DC magnetic field, a plurality of stator windings arranged in sections in the moving direction of the movable member, inverters disposed so as to be able to independently control the frequency of a voltage applied to the corresponding stator winding, and a mechanism for controlling the inverters so that, when the movable member moves from the section to the next section, the phase and frequency of a voltage applied to the stator winding in the section match those in the next section.

SUMMARY OF THE INVENTION

According to one aspect of the present invention, a linear motor device includes the following elements. A linear motor includes a movable member having a plurality of fields and a stator in which a plurality of armatures including polyphase coils are arranged in line in the moving direction of the movable member. A position detector detects the relative position of the movable member. A plurality of current amplifiers are connected to the armatures, respectively. Each current amplifier supplies current based on a control command to excite the corresponding armature. A controller sequentially outputs the control commands to the current amplifiers in accordance with the relative position of the movable member. The controller selectively outputs the control commands to only the current amplifiers corresponding to the armatures which are opposite the movable member such that the armatures are positioned within a range corresponding to the length in the moving direction of the movable member.

According to another aspect of the present invention, a linear motor device includes the following elements. A linear motor includes a movable member having a plurality of fields and a stator in which a plurality of armatures including polyphase coils are arranged in a predetermined number of parallel lines in the moving direction of the movable member, the parallel lines being shifted by a predetermined shift amount. A position detector detects the relative position of the movable member. A plurality of current amplifiers are connected to the armatures, respectively. Each current amplifier supplies current based on a control command to excite the corresponding armature. A controller sequentially outputs the control commands to the current amplifiers in accordance with the relative position of the movable member. The controller selectively outputs the control commands to only the current amplifiers corresponding to the armatures which are opposite the movable member such that the armatures are positioned within a range corresponding to the length in the moving direction of the movable member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

Figure 1:
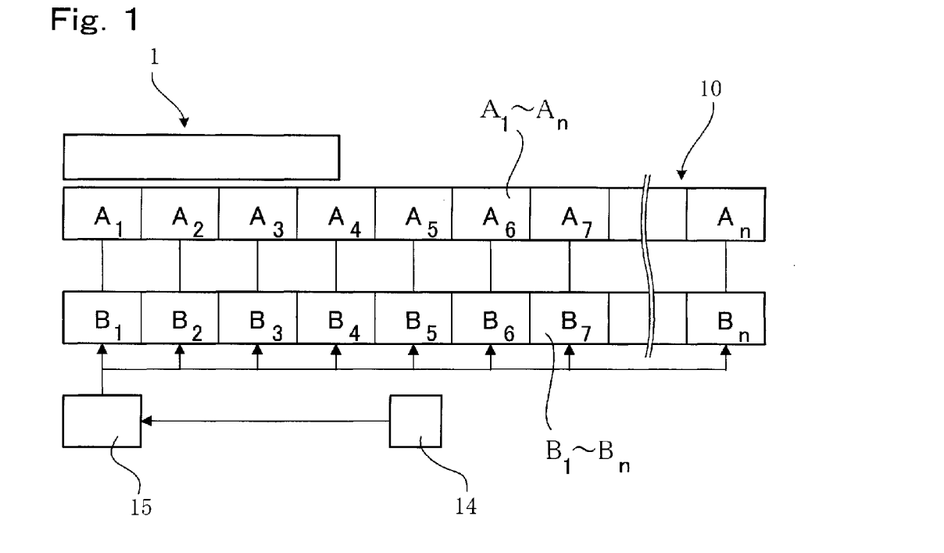
FIG. 1 is a diagram illustrating the entire structure of a linear motor device according to a first embodiment of the present invention.

FIG. 1 illustrates the entire structure of a linear motor device according to a first embodiment of the present invention. Referring to FIG. 1, the linear motor device includes a linear motor including a movable member 1 and a stator 10, a position detector 14, a controller 15, armatures $A_1$ to $A_n$ arranged in the stator 10, and current amplifiers $B_1$ to $B_n$.

Figure 2A:
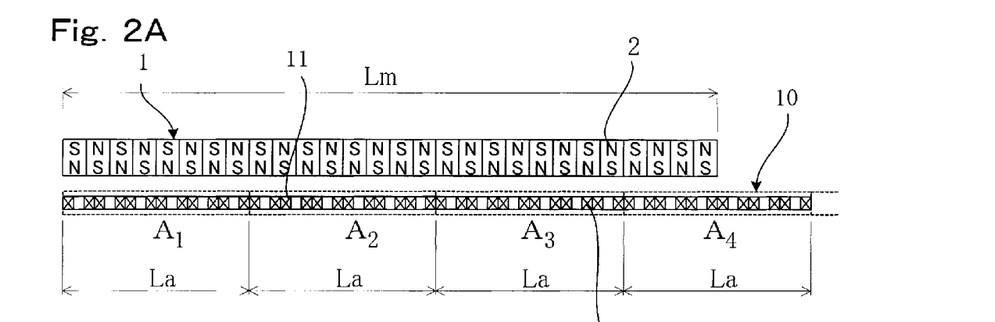
FIG. 2A is a diagram illustrating the relative positional relationship between a movable member and a stator in the linear motor device according to the first embodiment.
Figure 2B:
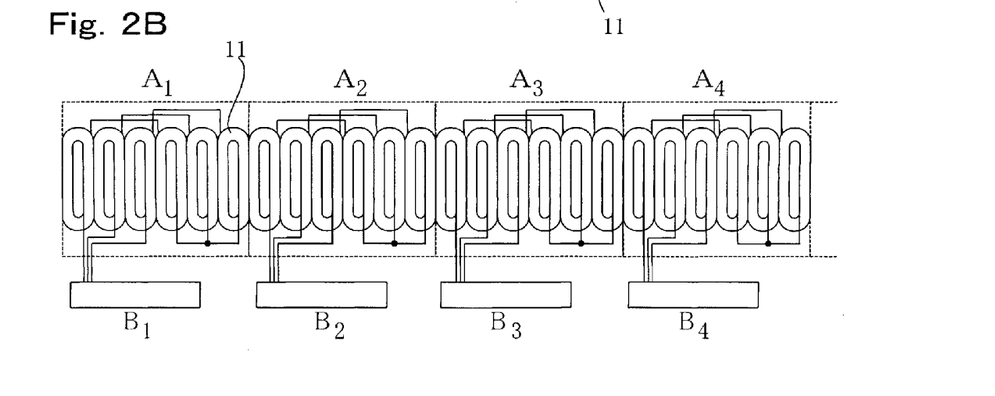
FIG. 2B is a diagram illustrating the connection of armatures $A_1$ to $A_n$ to current amplifiers $B_1$ to $B_n$ in the linear motor device according to the first embodiment.

FIG. 2A illustrates the relative positional relationship between the movable member 1 and the stator 10. FIG. 2B illustrates the connection of the armatures $A_1$ to $A_n$ to the current amplifiers $B_1$ to $B_n$.

Referring to FIGS. 2A and 2B, the movable member 1 includes a plurality of permanent magnets 2 and the stator 10 includes the armatures including polyphase coils 11 arranged in line. Let Lm denote the length in the moving direction of the movable member 1 and let La denote the length in the moving direction of each of the armatures $A_1$ to $A_n$.

The movable member 1 includes the permanent magnets 2 which serve as a plurality of field poles. A supporting mechanism (not illustrated) allows the movable member 1 to be movable relative to the stator 10 with a predetermined space therebetween.

The stator 10 includes the n armatures $A_1$ to $A_n$ arranged in line. The armatures $A_1$ to $A_n$ are each composed of six coils 11 constituting a three-phase armature winding.

As for the U, V, and W phases in the linear motor, the coils 11 of the same phase are connected in series. The beginning ends of the U-, V-, and W-phase coils are connected to the n current amplifiers $B_1$ to $B_n$, which are equal in number to the armatures $A_1$ to $A_n$. The terminal ends of the U-, V-, and W-phase coils are connected as neutral points.

The controller 15 checks a thrust command value against relative position information indicating the relative position of the movable member obtained by the position detector 14 and real current information obtained by a current detector (not illustrated) to generate a current command value including a current phase and a current amplitude. In this case, a thrust command is generated in the controller 15. Alternatively, the thrust command is given to the controller 15 by an external device (not illustrated). Control commands are current commands (for example, three-phase current commands) to the armatures $A_1$ to $A_n$ having the polyphase coils.

The current amplifiers $B_1$ to $B_n$ supply three-phase current to the armatures $A_1$ to $A_n$ on the basis of the current command values. The position detector 14 includes, for example, a Hall element, a linear encoder, or a laser interferometer.

When let La denote the length in the moving direction of each of the armatures $A_1$ to $A_n$, let P denote a maximum number of excited armatures of the armatures $A_1$ to $A_n$, and let Lm denote the length in the moving direction of the movable member 1, the linear motor device is constructed so as to satisfy the following expression.

$$(P+1) \times La \leq Lm < (P+2) \times La$$

In the first embodiment, since the maximum number P of excited armatures is equal to two (P=2), the expression is as follows.

$$3 \times La \leq Lm < 4 \times La$$

To satisfy the above expression, the length Lm in the moving direction of the movable member 1 is preset as follows.

$$Lm = 3.5 \times La$$

In addition, the length of each coil 11 and that of each permanent magnet 2 are set so that the total length of the three coils 11 is the same as that of the four permanent magnets 2 (four poles).

Since the armatures $A_1$ to $A_n$ each include six coils 11, the number of permanent magnets 2 for the length La in the moving direction of the armature is eight. Accordingly, the movable member 1 includes 28 (=3.5×8) permanent magnets 2 in all.

An operation of exciting the armatures $A_1$ to $A_n$ in the linear motor device with the above-described structure will now be described.

Figure 3A:
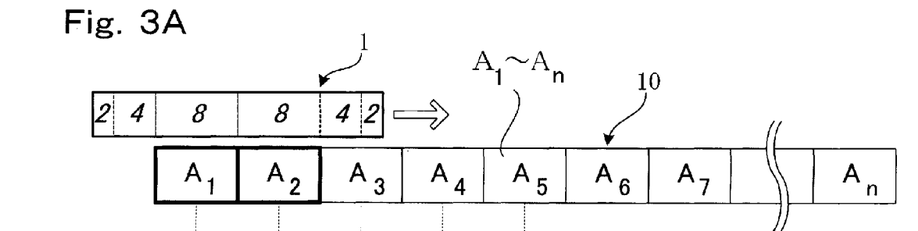
FIG. 3A is a diagram illustrating a first exciting operation of the linear motor device according to the first embodiment.
Figure 3B:
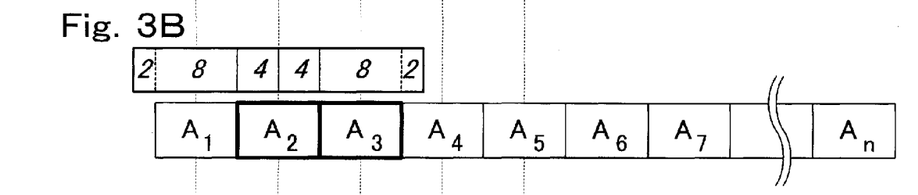
FIG. 3B is a diagram illustrating a second exciting operation of the linear motor device according to the first embodiment.
Figure 3C:
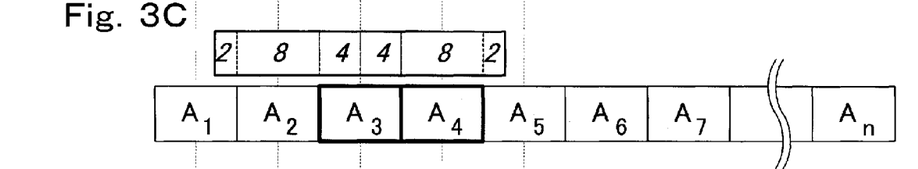
FIG. 3C is a diagram illustrating a third exciting operation of the linear motor device according to the first embodiment.

FIG. 3A illustrates a first exciting operation of the linear motor device according to the first embodiment of the present invention. FIG. 3B illustrates a second exciting operation of the linear motor device according to this embodiment. FIG. 3C illustrates a third exciting operation of the linear motor device according to this embodiment. FIGS. 3A to 3C illustrate the operations of sequentially exciting the armatures $A_1$ to $A_n$ when the movable member 1 illustrated in FIG. 1 is moved from the left to the right. In FIGS. 3A to 3C, the armatures $A_1$ to $A_4$ are sequentially excited.

Figure 3D:
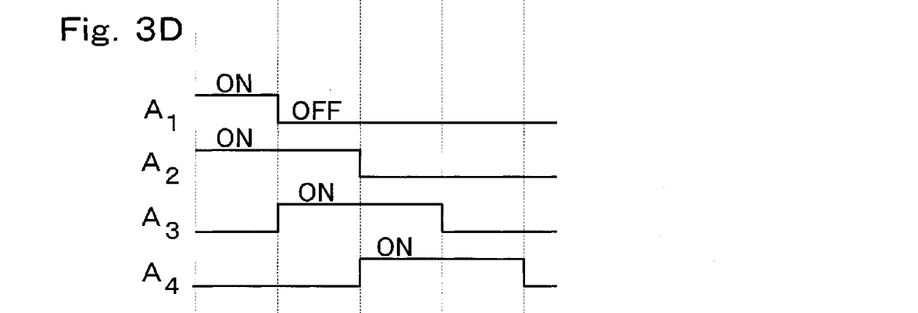
FIG. 3D is a diagram illustrating a sequence of switching between the armatures $A_1$ to $A_n$ in the linear motor device according to the first embodiment.

FIG. 3D illustrates a sequence of switching between the armatures $A_1$ to $A_n$. In this case, the sequence of switching between the armatures $A_1$ to $A_4$ is illustrated.

Referring to FIGS. 3A to 3C, each italic numeral in the movable member 1 indicates the number of permanent magnets 2 which serve as the field poles.

In FIG. 3A, the armatures $A_1$ and $A_2$ facing the movable member 1 are excited. The number of excited armatures is two. In the first embodiment, the maximum number P of excited armatures is equal to two (P=2).

When the movable member 1 moves to the right such that the movable member 1 is positioned as illustrated in FIG. 3B, the armature $A_1$ is de-excited (OFF) and the armature $A_3$ is excited (ON). At this time, the movable member 1 faces the armature $A_1$ and also faces the armature $A_3$.

When the movable member 1 further moves to the right such that the movable member 1 is positioned as illustrated in FIG. 3C, the armature $A_2$ is de-excited (OFF) and the armature $A_4$ is excited (ON). At this time, the movable member 1 faces the armature $A_2$ and also faces the armature $A_4$.

In the first embodiment, the maximum number P of excited armatures is equal to two (P=2). The armatures $A_1$ and $A_2$ in FIG. 3A, the armatures $A_2$ and $A_3$ in FIG. 3B, and the armatures $A_3$ and $A_4$ in FIG. 3C are indicated by bold frames each representing the excited armature.

Referring to FIG. 3D, the axis of abscissas indicates the middle of the movable member 1. When the middle of the movable member 1 is located in the boundary between the armatures $A_1$ and $A_2$ (FIG. 3A), the armatures $A_1$ and $A_2$ are excited (ON). When the middle of the movable member 1 is located at the middle of the armature $A_2$ (FIG. 3B), the armatures $A_2$ and $A_3$ are excited (ON). When the middle of the movable member 1 is located in the middle of the armature $A_3$ (FIG. 3C), the armatures $A_3$ and $A_4$ are excited (ON).

Such an exciting operation is subsequently repeated. The preceding excited state is held until the exciting operation is switched to another one. For example, assuming that the middle of the movable member 1 is located at the middle of the armature $A_4$, the armatures $A_4$ and $A_5$ are excited (ON). Until this excited state is obtained, the armatures $A_3$ and $A_4$ are excited (ON).

As for the relative position information about the movable member 1, the relative position of the movable member 1 is accurately detected by the position detector 14 in FIG. 1. The controller 15 in FIG. 1 generates ON timing and OFF timing for each armature on the basis of the relative position information. In this manner, the operation of sequentially exciting the armatures $A_1$ to $A_n$ is performed in accordance with the movement of the movable member 1.

The linear motor device according to the first embodiment is constructed to switch the armatures between the excited (ON) and de-excited (OFF) states so that the armatures switched between the ON and OFF states are surely positioned within a range corresponding to the length in the moving direction of the movable member 1 in states before and after the excited state is switched to another one (e.g., the states in FIGS. 3A and 3B and those in FIGS. 3B and 3C) and the fields do not act over the excited armatures.

A state in which the fields act over the excited armatures means that the armatures positioned on the outside of the range corresponding to the length in the moving direction of the movable member 1 are switched between the excited (ON) and de-excited (OFF) states. If the fields act over the excited armatures, induced voltages generated in the coils of the phases by the permanent magnets of the movable member have a large difference therebetween (become imbalanced), thus causing circulating current. The circulating current causes disturbance in a current control system. Unfortunately, current according to a predetermined thrust is not supplied to each armature to be excited, so that thrust ripple occurs. When the linear motor device is applied to a precision machine, such as a semiconductor manufacturing apparatus, a liquid crystal manufacturing apparatus, or a machine tool, the above thrust ripple may seriously affect a desired accuracy of the precision machine.

In the linear motor device with the above-described structure, switching between the excited (ON) and de-excited (OFF) states is performed on an armature-by-armature basis, the armatures each including the coils. In addition, the length of each armature and that of each field are preset (such that the total length of three coils 11 is the same as that of four permanent magnets 2 (four poles) in FIG. 2A) so that the fields do not act over the excited armatures, and switching between the excited (ON) and de-excited (OFF) states is performed. Consequently, the linear motor device can be made compact even when a stroke is increased and reduce heat generation. Furthermore, damping force caused by circulating current can be eliminated.

Figure 4:
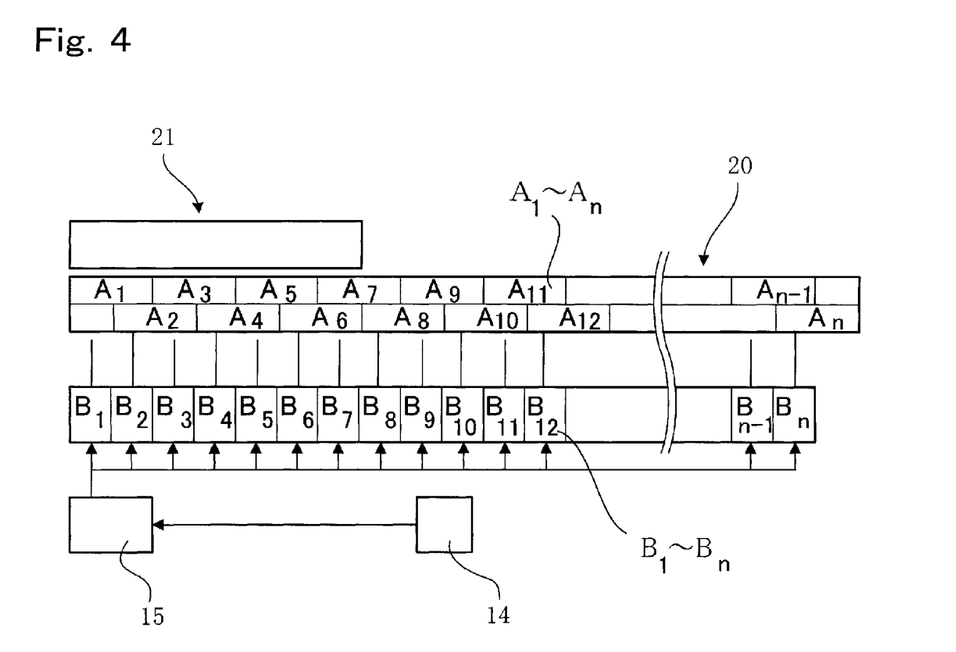
FIG. 4 is a diagram illustrating the entire structure of a linear motor device according to a second embodiment of the present invention.

FIG. 4 illustrates the entire structure of a linear motor device according to a second embodiment of the present invention. Referring to FIG. 4, the linear motor device includes a linear motor including a movable member 21 and a stator 20, a position detector 14, a controller 15, armatures $A_1$ to $A_n$ arranged in the stator 20, and current amplifiers $B_1$ to $B_n$.

Figure 5A:
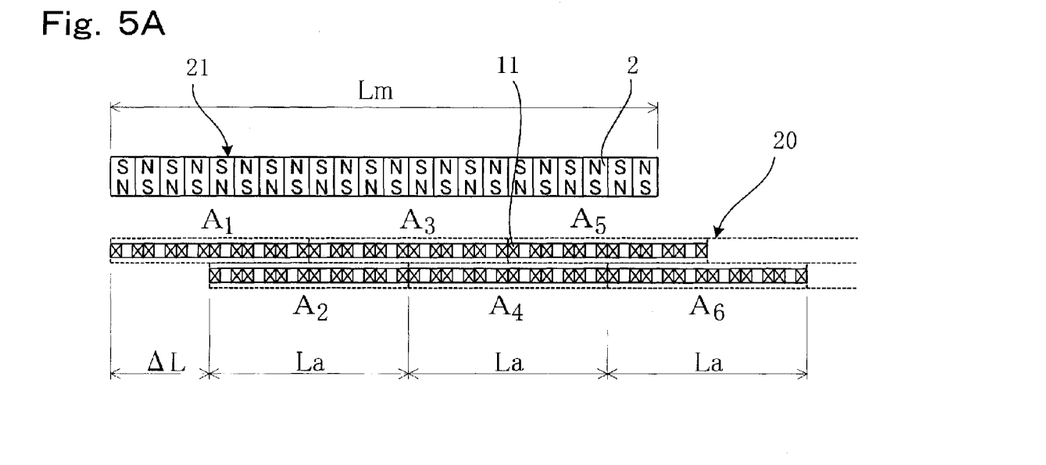
FIG. 5A is a diagram illustrating the relative positional relationship between a movable member and a stator in the linear motor device according to the second embodiment.
Figure 5B:
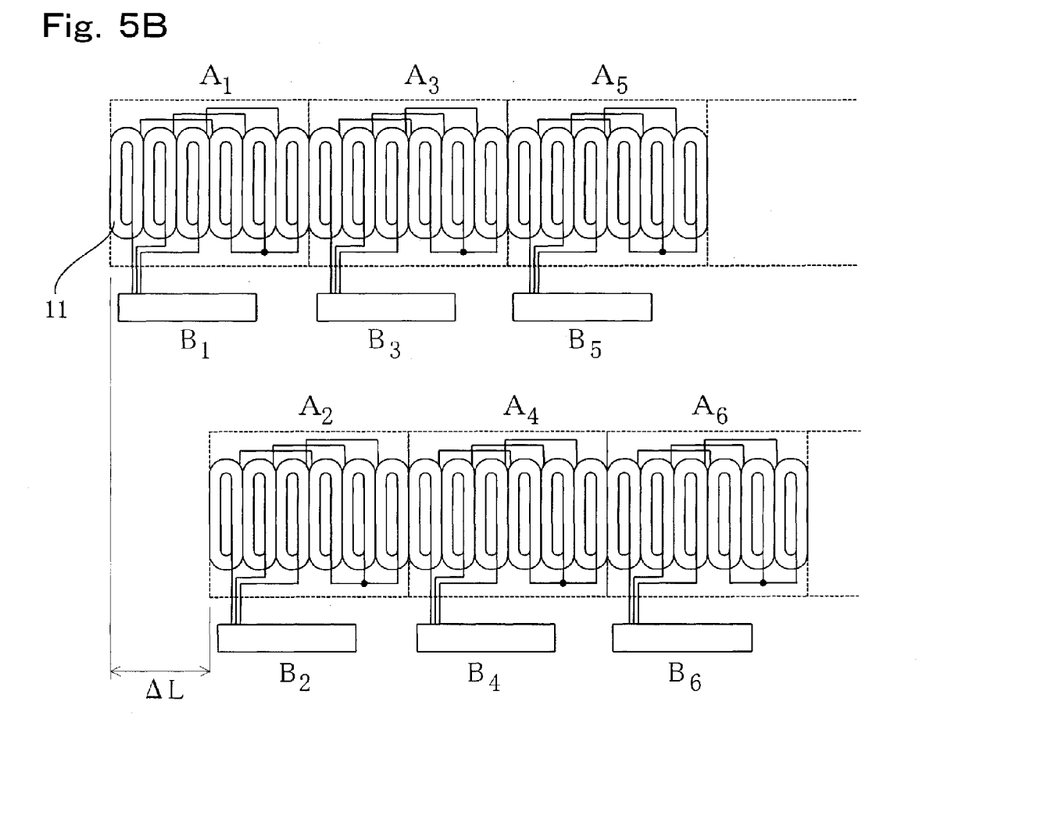
FIG. 5B is a diagram illustrating the connection of armatures $A_1$ to $A_n$ to current amplifiers $B_1$ to $B_n$ in the linear motor device according to the second embodiment.

FIG. 5A illustrates the relative positional relationship between the movable member 21 and the stator 20. FIG. 5B illustrates the connection of the armatures $A_1$ to $A_n$ to the current amplifiers $B_1$ to $B_n$.

Since components designated by the same reference numerals in FIGS. 1 to 3C have the same actions and effects, detailed explanation thereof is omitted.

In the stator 20, the n armatures $A_1$ to $A_n$ are arranged in a predetermined number of parallel lines shifted by a predetermined amount, or having a predetermined shift amount therebetween. The armatures $A_1$ to $A_n$ each include six coils 11 constituting a three-phase armature winding.

When let Q denote the number of parallel lines of the armatures $A_1$ to $A_n$, let La denote the length in the moving direction of each of the armatures $A_1$ to $A_n$, let P denote a maximum number of excited armatures of the armatures $A_1$ to $A_n$, and let Lm denote the length in the moving direction of the movable member 21, the linear motor device is constructed so as to satisfy the following expression.

$$(P+Q) \times La/Q \leq Lm < (P+Q+1) \times La/Q$$

Furthermore, when let $\Delta L$ denote the shift amount between the lines of the armatures $A_1$ to $A_n$, the linear motor device is constructed so as to satisfy the following expression.

$$\Delta L = La/Q$$

In the second embodiment, the number Q of parallel lines is equal to two (Q=2) and the maximum number P of excited armatures is equal to three (P=3). Accordingly, the above expression is as follows.

$$2.5 \times La \leq Lm < 3 \times La$$

To satisfy the above expression, the length Lm in the moving direction of the movable member 21 is set as follows.

$$Lm = 2.75 \times La$$

The shift amount $\Delta L$ between the lines is expressed as follows.

$$\Delta L = La/2$$

As described above, the length Lm in the moving direction of the movable member 21 is shorter than that in the first embodiment ($3 \times La \leq Lm < 4 \times La$, Lm=$3.5 \times La$).

In addition, the length of each coils 11 and that of each permanent magnet 2 are set so that the total length of three coils 11 is the same as that of four permanent magnets 2 (four poles) in a manner similar to the first embodiment. Since the armatures $A_1$ to $A_n$ each include six coils 11, the number of permanent magnets 2 for the length La in the moving direction of the armature is eight. Accordingly, the movable member 21 includes 22 (=2.75×8) permanent magnets 2 in all.

Since the armatures $A_1$ to $A_n$ each include six coils 11, the number of coils corresponding to the shift amount $\Delta L$ (=La/2) is three. The armature $A_2$ in the second line is shifted relative to the coils of the armature $A_1$ in the first line by the shift amount $\Delta L$ corresponding to three coils.

Specifically, the coils 11 of the armatures $A_1$ and $A_2$ in the first and second lines are arranged such that the coils of the same phase coincide with each other. This prevents shifting by the shift amount $\Delta L$ from causing a reduction in thrust.

An operation of sequentially exciting the armatures $A_1$ to $A_n$ in the linear motor device with the above-described structure will be described below.

Figure 6A:
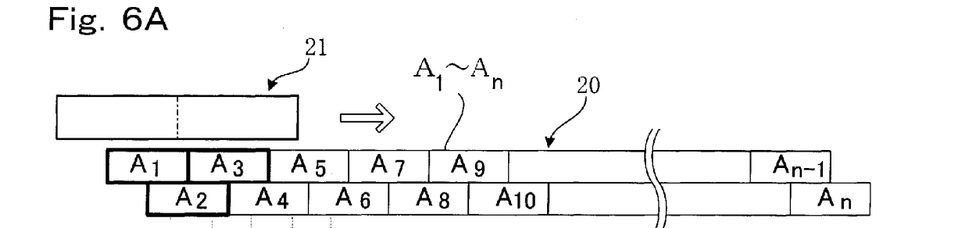
FIG. 6A is a diagram illustrating a first exciting operation of the linear motor device according to the second embodiment.
Figure 6B:
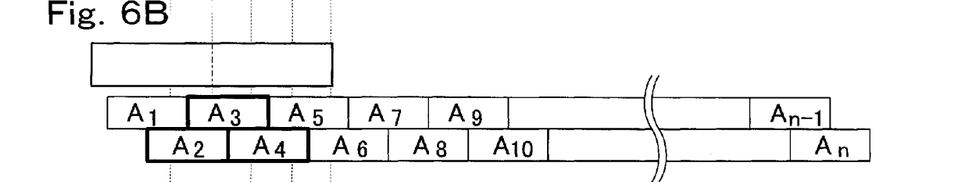
FIG. 6B is a diagram illustrating a second exciting operation of the linear motor device according to the second embodiment.
Figure 6C:
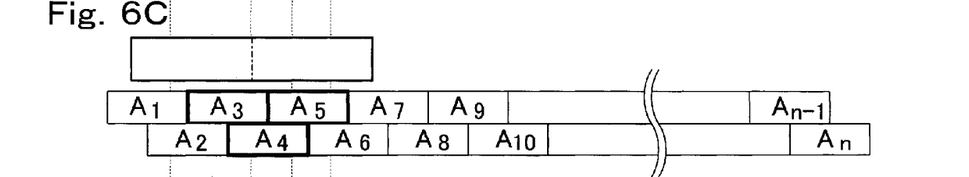
FIG. 6C is a diagram illustrating a third exciting operation of the linear motor device according to the second embodiment.

FIG. 6A illustrates a first exciting operation of the linear motor device according to the second embodiment of the present invention. FIG. 6B illustrates a second exciting operation of the linear motor device according to this embodiment. FIG. 6C illustrates a third exciting operation of the linear motor device according to this embodiment. FIGS. 6A to 6C illustrate the operations of sequentially exciting the armatures $A_1$ to $A_n$ when the movable member 21 is moved from the left to the light in FIG. 4. In FIGS. 6A to 6C, the armatures $A_1$ to $A_5$ are sequentially excited.

Figure 6D:
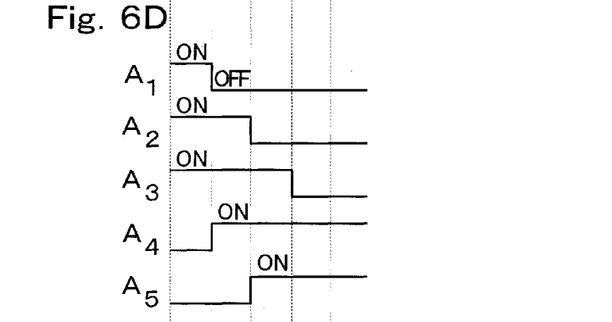
FIG. 6D is a diagram illustrating a sequence of switching between armatures $A_1$ to $A_n$ in the linear motor device according to the second embodiment.

FIG. 6D illustrates a sequence of switching between the armatures $A_1$ to $A_n$. In FIG. 6D, switching between the armatures $A_1$ to $A_5$ is performed. Since components designated by the same reference numerals as those in FIGS. 1 to 5B have the same actions and effects, detailed explanation thereof is omitted.

Referring to FIG. 6A, the three armatures $A_1$, $A_2$, and $A_3$ opposite the movable member 21 are excited. The number of excited armatures is three. In the second embodiment, the maximum number P of excited armatures is three (P=3).

When the movable member 21 is moved to the right such that the movable member 21 is positioned as illustrated in FIG. 6B, the armature $A_1$ is de-excited (OFF) and the armature $A_4$ is excited (ON). At this time, the movable member 21 is opposite the armature $A_1$ and is also opposite the armature $A_4$.

When the movable member 21 is further moved to the right such that the movable member 21 is positioned as illustrated in FIG. 6C, the armature $A_2$ is de-excited (OFF) and the armature $A_5$ is excited (ON). At this time, the movable member 21 is opposite the armature $A_2$ and is also opposite the armature $A_5$.

In the second embodiment, the maximum number P of excited armatures is equal to three (P=3). The armatures $A_1$, $A_2$, and $A_3$ in FIG. 6A, the armatures $A_2$, $A_3$, and $A_4$ in FIG. 6B, and the armatures $A_3$, $A_4$, and $A_5$ in FIG. 6C are indicated by bold frames each representing the excited armature.

In FIG. 6D, the axis of abscissas indicates the middle of the movable member 21. When the middle of the movable member 21 is opposite the armatures $A_1$ and $A_2$ (FIG. 6A), the armatures $A_1$, $A_2$, and $A_3$ are excited (ON). When the middle of the movable member 21 is opposite the armatures $A_2$ and $A_3$ (FIG. 6B), the armatures $A_2$, $A_3$, and $A_4$ are excited (ON). When the middle of the movable member 21 is opposite the armatures $A_3$ and $A_4$ (FIG. 6C), the armatures $A_3$, $A_4$, and $A_5$ are excited (ON).

Such an exciting operation is subsequently repeated. The preceding excited state is maintained until the exciting operation is switched to another one. For example, when the middle of the movable member 21 is opposite the armatures $A_4$ and $A_5$, the armatures $A_4$, $A_5$, and $A_6$ are excited (ON). Until this excited state is obtained, the armatures $A_3$, $A_4$, and $A_5$ are excited (ON).

As for information about the relative position of the movable member 21, the relative position of the movable member 21 is accurately detected by the position detector 14 in FIG. 4. The controller 15 in FIG. 4 controls ON timing and OFF timing for each armature on the basis of the relative position information. In this manner, the operation of sequentially exciting the armatures $A_1$ to $A_n$ is performed in accordance with the movement of the movable member 21.

The linear motor device according to the second embodiment of the present invention is constructed to switch the armatures between the excited (ON) and de-excited (OFF) states so that the armatures switched between the ON and OFF states are surely positioned in a range corresponding to the length of the movable member 21 in states before and after the excited state is switched to another one (e.g., the states in FIGS. 6A and 6B and those in FIGS. 6B and 6C) and fields do not act over the excited armatures.

A state in which the fields act over the excited armatures means that the armatures positioned on the outside of the range corresponding to the length in the moving direction of the movable member 1 are switched between the excited (ON) and de-excited (OFF) states. If the fields act over the excited armatures, induced voltages generated in the coils of the phases by the permanent magnets of the movable member have a large difference therebetween (become imbalanced), thus causing circulating current. The circulating current causes disturbance in a current control system. Unfortunately, current according to a predetermined thrust is not supplied to each armature to be excited, so that thrust ripple occurs. When the linear motor device is applied to a precision machine, such as a semiconductor manufacturing apparatus, a liquid crystal manufacturing apparatus, or a machine tool, the above thrust ripple may seriously affect a desired accuracy of the precision machine.

In the linear motor device with the above-described structure, since the length of each armature and that of each field are set so that the fields do not act over the excited armatures, the same advantages as those of the first embodiment can be obtained.

Specifically, switching between the ON and OFF states is performed on an armature-by-armature basis, the armatures each including the coils. In addition, the length of each armature and that of each field are preset (such that the total length of three coils 11 is the same as that of four permanent magnets 2 (four poles) in FIG. 5A) so that the fields do not act over the excited armatures, and switching between the ON and OFF states is performed. Consequently, the linear motor device can be made compact even when a stroke is increased and reduce heat generation. Furthermore, damping force caused by circulating current can be eliminated.

Moreover, the armatures are arranged in Q parallel lines such that the lines are shifted by the shift amount ΔL. Accordingly, the total length Lm in the moving direction of the fields can be shorter than that in the first embodiment even when the length La in the moving direction of each armature is the same as that in the first embodiment. In other words, the linear motor device can be further reduced in size.

Figure 7A:
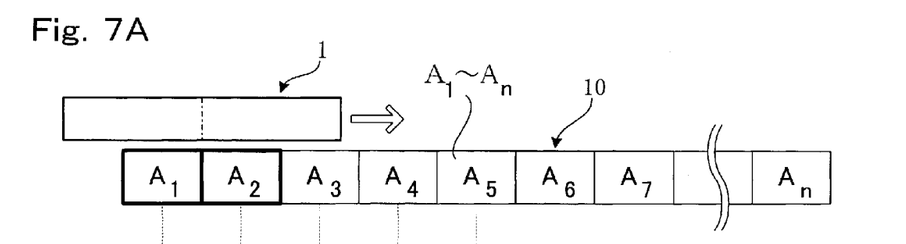
FIG. 7A is a diagram illustrating a first exciting operation of a linear motor device according to a third embodiment of the present invention.
Figure 7B:
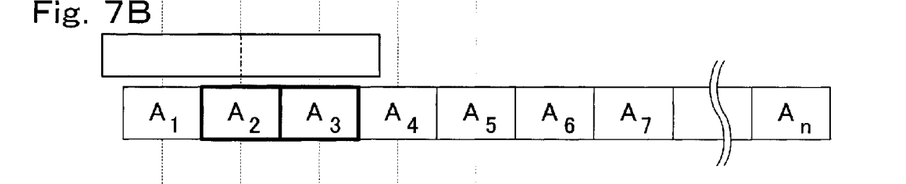
FIG. 7B is a diagram illustrating a second exciting operation of the linear motor device according to the third embodiment.
Figure 7C:
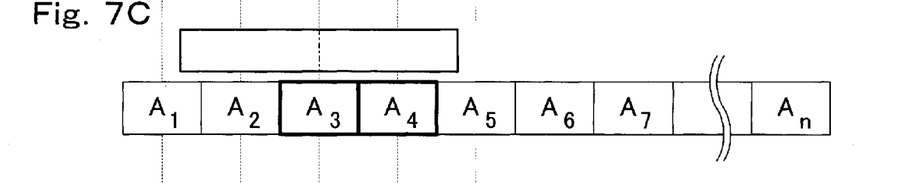
FIG. 7C is a diagram illustrating a third exciting operation of the linear motor device according to the third embodiment.

FIG. 7A illustrates a first exciting operation of a linear motor device according to a third embodiment of the present invention. FIG. 7B illustrates a second exciting operation of the linear motor device according to this embodiment. FIG. 7C illustrates a third exciting operation of the linear motor device according to this embodiment.

Figure 7D:
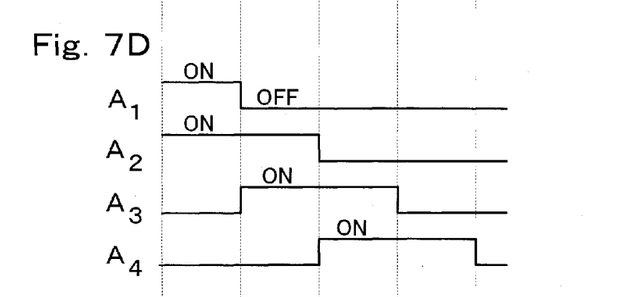
FIG. 7D is a diagram illustrating a sequence of switching between armatures $A_1$ to $A_n$ in the linear motor device according to the third embodiment.

FIG. 7D illustrates a sequence of switching between armatures $A_1$ to $A_n$. In FIG. 7D, the sequence of switching between the armatures $A_1$ to $A_4$ is illustrated.

FIGS. 7A to 7D illustrate the same exciting operations as those in the first embodiment (namely, correspond to FIGS. 3A to 3D).

In other words, FIGS. 7A to 7C illustrate the operations of sequentially exciting the armatures $A_1$ to $A_n$ when the movable member 1 is moved from the left to the right in FIG. 1. In FIGS. 7A to 7C, the armatures $A_1$ to $A_4$ are sequentially excited.

Figure 7E:
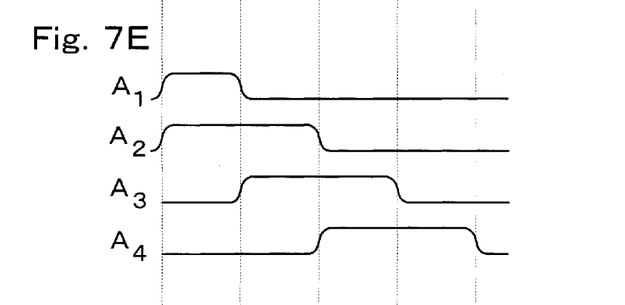
FIG. 7E is a diagram illustrating thrust commands in the linear motor device according to the third embodiment.

FIG. 7E illustrates thrust commands in the linear motor device according to the third embodiment. The thrust commands illustrated in FIG. 7E are based on control commands transmitted to the armatures $A_1$ to $A_4$ from the controller 15 in FIG. 1. In this case, the thrust commands are generated in the controller 15. Alternatively, the thrust commands are given to the controller 15 from an external device (not illustrated). The control commands also serve as current commands (e.g., three-phase current commands) transmitted to the armatures $A_1$ to $A_n$ each including polyphase coils. Since components designated by the same reference numerals as those in FIGS. 1 to 6D have the same actions and effects, detailed explanation thereof is omitted.

Referring to FIG. 7E, during the initiation and termination of excitation, each thrust command is illustrated as being in a constantly accelerated mode in which a thrust produced by the movable member 1 is constant at any time.

Specifically, during the excitation initiation of each armature, the thrust command is smoothly changed from zero to a predetermined thrust value in accordance with the relative position. During the excitation termination of each armature, the thrust command is smoothly changed from the predetermined thrust value to zero in accordance with the relative position.

In this case, an amount (or inclination) by which a thrust command is smoothly changed may be appropriately determined. To keep a thrust produced by the movable member 1 at a constant value at any time, the controller 15 illustrated in FIG. 1 outputs control commands so that the sum of thrust command values for the armatures is constant at any time.

The third embodiment has been described with respect to the case where each thrust command in the first embodiment is smoothly changed. Needless to say, this case may be similarly applied to the second embodiment.

The linear motor device with the above-described structure has no sharp change in thrust command and produces no shock upon excitation switching, thus preventing thrust ripple.

Figure 8A:
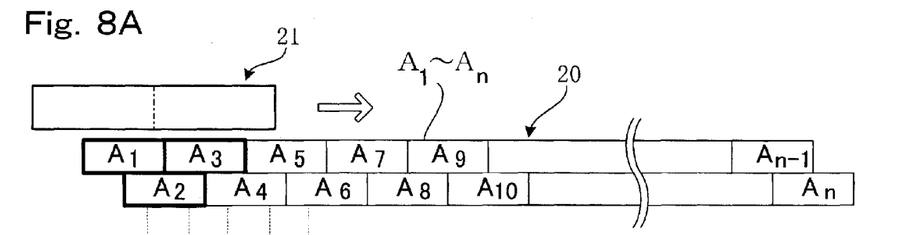
FIG. 8A is a diagram illustrating a first exciting operation of a linear motor device according to a fourth embodiment of the present invention.
Figure 8B:
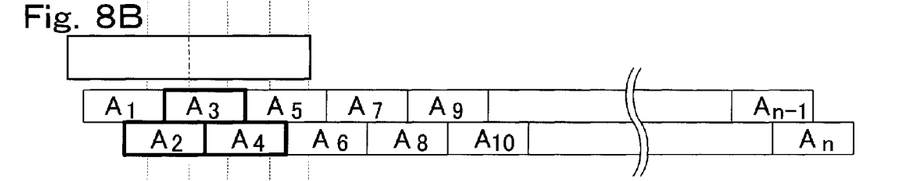
FIG. 8B is a diagram illustrating a second exciting operation of the linear motor device according to the fourth embodiment.
Figure 8C:
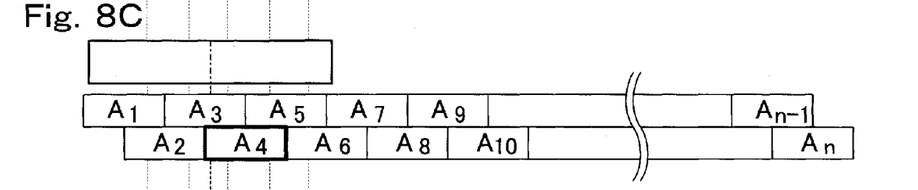
FIG. 8C is a diagram illustrating a third exciting operation of the linear motor device according to the fourth embodiment.
Figure 8D:
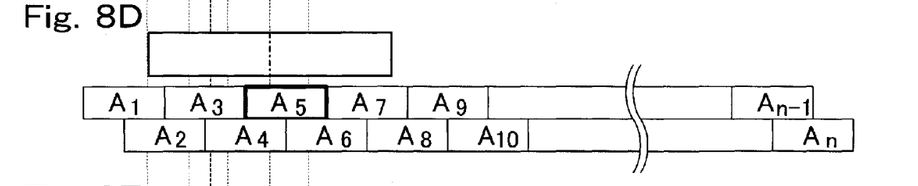
FIG. 8D is a diagram illustrating a fourth exciting operation of the linear motor device according to the fourth embodiment.

FIG. 8A illustrates a first exciting operation of a linear motor device according to a fourth embodiment of the present invention. FIG. 8B illustrates a second exciting operation of the linear motor device according to this embodiment. FIG. 8C illustrates a third exciting operation of the linear motor device according to this embodiment. FIG. 8D illustrates a fourth exciting operation of the linear motor device according to this embodiment. FIGS. 8A to 8D illustrate the operations of sequentially exciting armatures $A_1$ to $A_n$ when the movable member 21 illustrated in FIG. 4 is moved from the left to the right. In FIGS. 8A to 8D, the operations for sequentially exciting the armatures $A_1$ to $A_5$ are illustrated.

Figure 8E:
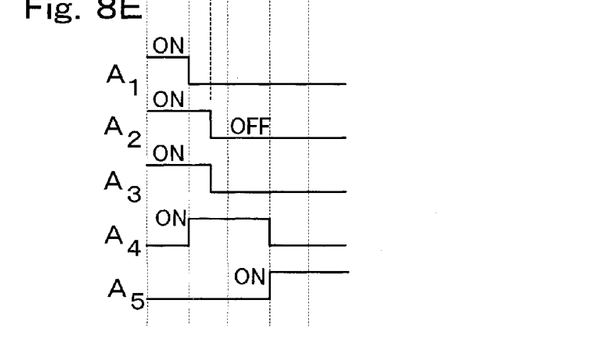
FIG. 8E is a diagram illustrating a sequence of switching between armatures $A_1$ to $A_n$ in the linear motor device according to the fourth embodiment.

FIG. 8E illustrates a sequence of switching between the armatures $A_1$ to $A_n$ in the linear motor device according to the fourth embodiment. In FIG. 8E, the sequence of switching between the armatures $A_1$ to $A_5$ is illustrated. Since components designated by the same reference numerals as those in FIGS. 1 to 7C, detailed explanation thereof is omitted.

In the linear motor device according to the fourth embodiment, the number of excited armatures is varied in accordance with the magnitude of a thrust produced by the movable member 21. Specifically, in an adjustable speed interval (FIGS. 8A and 8B) of the movable member 21 in which a high thrust command value is required, the number of excited armatures is increased (to three in FIGS. 8A and 8B). On the other hand, in a constant speed interval (FIGS. 8C and 8D) of the movable member 21 in which a relatively low thrust command value is required, the number of excited armatures is reduced (to one in FIGS. 8C and 8D).

FIGS. 8A and 8B illustrate the interval in which the movable member 21 is accelerated and a high thrust command value is required. Referring to FIG. 8A, the three armatures $A_1$, $A_2$, and $A_3$ opposite the movable member 21 are excited.

When the movable member 1 is moved to the right such that the movable member 1 is positioned as illustrated in FIG. 8B, the armature $A_1$ is de-excited (OFF) and the armature $A_4$ is excited (ON). This state is the same as the second embodiment.

FIG. 8C illustrates the time at which the interval in which acceleration is shifted to a constant speed and in which the movable member 21 is moved at the constant speed and a thrust command value is reduced so as to be below a preset reference value for changing the number of excited armatures. At this time, the armatures $A_2$ and $A_3$ are de-excited (OFF) and the armature $A_4$ alone is excited (ON).

FIG. 8D illustrates the interval in which the movable member 21 moves at the constant speed and the thrust command value is below the preset reference value for changing the number of excited armatures. The armature $A_4$ is de-excited (OFF) and the armature $A_5$ is excited (ON). The number of excited armatures is held at one.

The preset reference value for changing the number of excited armatures may be previously determined in accordance with a mechanism (not illustrated) in which the linear motor device is installed or specifications for driving the linear motor device. Alternatively, the reference value may be determined on the basis of a speed of the movable member upon driving or the position of the movable member.

The fourth embodiment has been described with respect to the case where varying the number of excited armatures is applied to the second embodiment. Needless to say, varying the number of excited armatures can be similarly applied to the first embodiment. The number of excited armatures to be varied ranges up to the maximum number P of excited armatures.

In addition, the linear motor device according to the fourth embodiment is constructed to switch the armatures between the ON and OFF states so that at least one armature switched between the ON and OFF states is surely positioned in a range corresponding to the length in the moving direction of the movable member 21 in states before and after the excited state is switched to another one (e.g., the states in FIGS. 8A and 8B, those in FIGS. 8B and 8C, and those in FIGS. 8C and 8D) and fields do not act over the excited armature in a manner similar to the first or second embodiment.

A state in which the fields act over the excited armature means that the armatures positioned on the outside of the range corresponding to the length in the moving direction of the movable member 1 are switched between the ON and OFF states. If the fields act over the excited armature, induced voltages generated in the coils of the phases by the permanent magnets of the movable member have a large difference therebetween (become imbalanced), thus causing circulating current. The circulating current causes disturbance in a current control system. Unfortunately, current according to a predetermined thrust is not supplied to each armature to be excited, so that thrust ripple occurs. When the linear motor device is applied to a precision machine, such as a semiconductor manufacturing apparatus, a liquid crystal manufacturing apparatus, or a machine tool, the above thrust ripple may seriously affect a desired accuracy of the precision machine.

The linear motor device with the above-described structure has the same advantages as those of the first or second embodiment because the length of each armature and that of each field are set so that the fields do not act over the excited armature.

Specifically, switching between the ON and OFF states is performed on an armature-by-armature basis, the armatures each including the coils. In addition, the length of each armature and that of each field are preset so that the fields do not act over the excited armature, and switching between the ON and OFF states is performed. Consequently, the linear motor device can be made compact even when a stroke is increased and reduce heat generation. Furthermore, damping force caused by circulating current can be eliminated.

In addition, since the number of excited armatures is varied in accordance with the magnitude of a thrust produced by the fields, the linear motor device in which excess power supply and an insufficient thrust are prevented can be provided.

The above-described first to fourth embodiments have been described with respect to the case using the position detector. Even when the position detector is eliminated and the armatures are excited to move the movable member while the position of the movable member is being estimated, alternatively, when the armatures are excited by V/f control to move the movable member, the advantages of the present invention can be obtained.

The above-described embodiments have been described with respect to the case where the single movable member is placed above the stator. Even when a plurality of movable members are placed above the stator and are independently controlled to move, the advantages of the present invention can be obtained.

In the above-described embodiments, the armatures are connected to the current amplifiers through cables. If the armatures are integrated with the current amplifiers to miniaturize the linear motor device, the advantages of the present invention can be obtained.

When the size of each armature and the capacity of each current amplifier are changed in accordance with a stroke or the magnitude of a thrust, the linear motor device according to the present invention can be applied to various apparatuses, e.g., an elevator apparatus and various conveyance apparatuses in addition to precision machines, such as a semiconductor manufacturing apparatus, a liquid crystal manufacturing apparatus, and a machine tool.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A linear motor device comprising:
   a linear motor that includes a movable member having a plurality of fields and a stator in which a plurality of armatures having polyphase coils are arranged in line in the moving direction of the movable member;
   a position detector that detects the relative position of the movable member;
   a plurality of current amplifiers connected to the armatures, respectively, each current amplifier supplying current based on a control command to excite the corresponding armature; and
   a controller that sequentially outputs the control commands to the current amplifiers in accordance with the relative position of the movable member, the controller selectively outputting the control commands to only the current amplifiers corresponding to the armatures which are opposite the movable member such that the armatures are positioned within a range corresponding to the length in the moving direction of the movable member.

2. The device according to claim 1, wherein the controller outputs the control command to each current amplifier during the initiation and termination of excitation of the corresponding armature so that the sum of thrust command values for a thrust produced by the movable member is constant at any time.

3. The device according to claim 1, wherein the controller varies the number of current amplifiers to which the controller outputs the control commands in accordance with the magnitude of a thrust command value for a thrust produced by the movable member.

4. The device according to claim 1, wherein when let Lm denote the length in the moving direction of the movable member, let La denote the length in the moving direction of each armature, and let P denote a maximum number of simultaneously excited armatures, the lengths Lm and La and the maximum number P are preset so as to satisfy the expression of $(P+1) \times La \leq Lm < (P+2) \times La$.

5. A linear motor device comprising:
   a linear motor that includes a movable member having a plurality of fields and a stator in which a plurality of armatures having polyphase coils are arranged in a predetermined number of parallel lines in the moving direction of the movable member, the parallel lines being shifted by a predetermined shift amount;
   a position detector that detects the relative position of the movable member;
   a plurality of current amplifiers connected to the armatures, respectively, each current amplifier supplying current based on a control command to excite the corresponding armature; and
   a controller that sequentially outputs the control commands to the current amplifiers in accordance with the relative position of the movable member, the controller selectively outputting the control commands to only the current amplifiers corresponding to the armatures which are opposite the movable member such that the armatures are positioned within a range corresponding to the length in the moving direction of the movable member.

6. The device according to claim 5, wherein the controller outputs the control command to each current amplifier during the initiation and termination of the corresponding armature so that the sum of thrust command values for a thrust produced by the movable member is constant at any time.

7. The device according to claim 5, wherein the controller varies the number of current amplifiers to which the controller outputs the control commands in accordance with the magnitude of a thrust command value for a thrust produced by the movable member.

8. The device according to claim 5, wherein when let Lm denote the length in the moving direction of the movable member, let La denote the length in the moving direction of each armature, let P denote a maximum number of simultaneously excited armatures, let $\Delta L$ denote the shift amount, and let Q denote the number of parallel lines, the lengths Lm and La, the maximum number P, the shift amount $\Delta L$, and the number Q are preset so as to satisfy the expression of $(P+Q) \times La/Q \leq Lm < (P+Q+1) \times La/Q$ where $\Delta L = La/Q$.

9. The device according to claim 5, wherein the shift amount by which the coils of the same phase of the armatures arranged in parallel coincide with each other in the linear motor is preset.

* * * * *